United States Patent [19]

Herr

[11] 4,396,850
[45] Aug. 2, 1983

[54] BRUSH BOARD ASSEMBLY FOR DYNAMOELECTRIC MACHINE WITH FLAT END COMMUTATOR

[75] Inventor: John A. Herr, Garwood, N.J.

[73] Assignee: The Singer Company, Stamford, Conn.

[21] Appl. No.: 338,933

[22] Filed: Jan. 12, 1982

[51] Int. Cl.³ .......................................... H02K 13/00
[52] U.S. Cl. .................................. 310/239; 310/68 R; 310/72; 310/237; 310/DIG. 6; 310/247
[58] Field of Search ............... 310/68 R, 68 D, 72, 310/42, 239–242, 244–247, 220, 221, 222, 237, 248, 233, DIG. 6, 43

[56] References Cited

U.S. PATENT DOCUMENTS

| 2,465,224 | 3/1949 | Hansen | 310/237 |
| 3,222,862 | 12/1965 | Webb | 310/68 R |
| 3,244,917 | 4/1966 | Gute | 310/237 |
| 3,271,601 | 9/1966 | Raver | 310/68 R |
| 3,453,513 | 7/1969 | Bates | 310/220 |
| 3,739,205 | 6/1973 | Winkelmann | 310/242 |
| 3,791,684 | 2/1974 | Hamman | 310/159 |
| 3,891,876 | 6/1975 | Herr | 310/40 MM |
| 3,924,147 | 12/1975 | Tarnow | 310/68 D |
| 4,049,984 | 9/1977 | Ishii et al. | 310/241 |
| 4,063,123 | 12/1977 | Herr | 310/233 |
| 4,119,875 | 10/1978 | Noguchi | 310/248 |

FOREIGN PATENT DOCUMENTS 2655249  6/1978  Fed. Rep. of Germany ...... 310/237

Primary Examiner—R. Skudy
Attorney, Agent, or Firm—William V. Ebs; Robert E. Smith; Edward L. Bell

[57] ABSTRACT

A brush board for a dynamoelectric machine is formed with resilient arms which are an integral part of the board and have commutator engageable brushes affixed at the free ends thereof. The board carries printed circuitry which extends to the free end of the arms and connects with the brushes.

2 Claims, 6 Drawing Figures

U.S. Patent  Aug. 2, 1983  Sheet 1 of 2  4,396,850
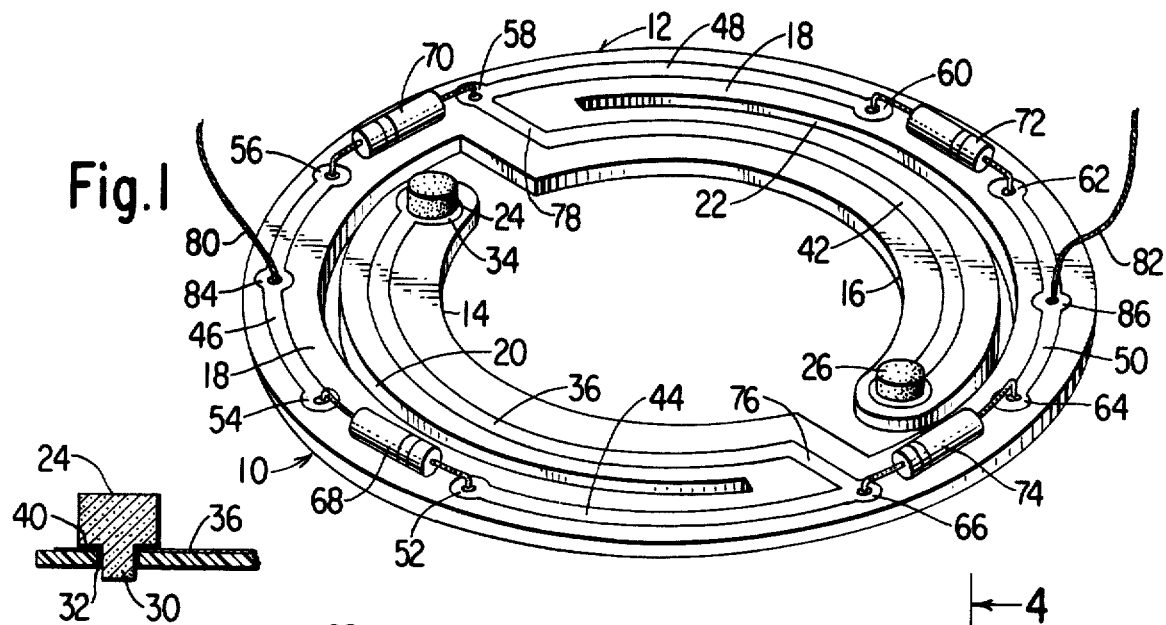
Fig.1
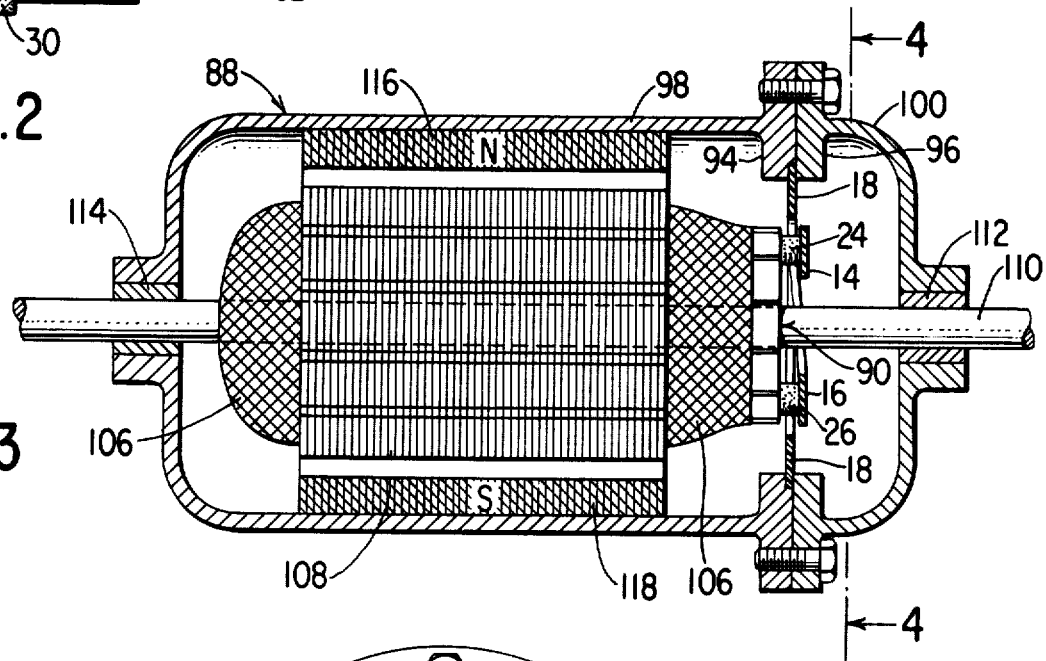
Fig.2
Fig.3
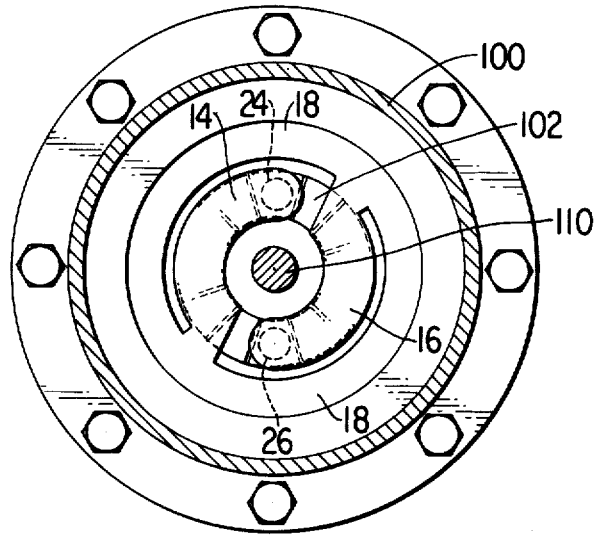
Fig.4

4,396,850

BRUSH BOARD ASSEMBLY FOR DYNAMOELECTRIC MACHINE WITH FLAT END COMMUTATOR

BACKGROUND OF THE INVENTION

1. Field of the Invention

The invention relates to brush board assemblies for dynamoelectric machines. More particularly, the invention is directed to a brush board assembly for a dynamoelectric machine with a flat end commutator.

2. Description of the Prior Art

The brushes of a dynamoelectric machine are conventionally slidably contained within a brush holder and biased by springs into engagement with the commutator to the machine. The brush holders and biasing springs in a machine with a flat end commutator are commonly carried in an end cap assembly such as shown, for example, in U.S. Pat. No. 3,244,917 of Loren R. Gute for "Dynamoelectric Machine" issued Apr. 5, 1956. The brush and spring carrying assemblies in common use are expensive because of the parts which are employed in their construction, the manner in which the parts must be assembled, and the manner in which electrical connections are made on the structure. The existing brush and spring carrying assemblies are therefor unsatisfactory for use in machines the cost of which is a primary consideration.

It is a principal object of the present invention to provide a dynamoelectric machine having a flat end commutator with a low cost brush board assembly not requiring the use of brush containing parts or separately fabricated brush biasing springs.

It is another object of the invention to provide a low cost brush board assembly as described having printed circuitry thereon which connects with input leads and with brushes cemented in place on the board.

Other objects and advantages of the invention will become apparent during a reading of the specification taken in connection with the accompanying drawings.

SUMMARY OF THE INVENTION

In accordance with the invention, a dynamoelectric machine with a flat end commutator is provided with a mounting board of a resilient material having arms which are an integral part of the board and which serve as springs for commutator brushes cemented in place on oppositely disposed free ends of the arms. The board carries printed circuitry which extends along the arms to the brushes and connects on the board with rectifying elements to provide a full wave bridge rectifier. Input leads connect with printed terminals provided in the circuitry which is carrier by the board.

DESCRIPTION OF THE DRAWINGS

FIG. 1 is a perspective view of a brush board assembly according to the invention for a dynamoelectric machine;

FIG. 2 is a fragmentary sectional view taken through a portion of the brush board assembly of FIG. 1;

FIG. 3 is a vertical sectional view taken through a motor in which the brush board assembly has been incorporated;

FIG. 4 is a cross-sectional view taken on the plane of the line 4—4 of FIG. 3;

DESCRIPTION OF THE PREFERRED EMBODIMENT OF THE INVENTION

Figure 5:
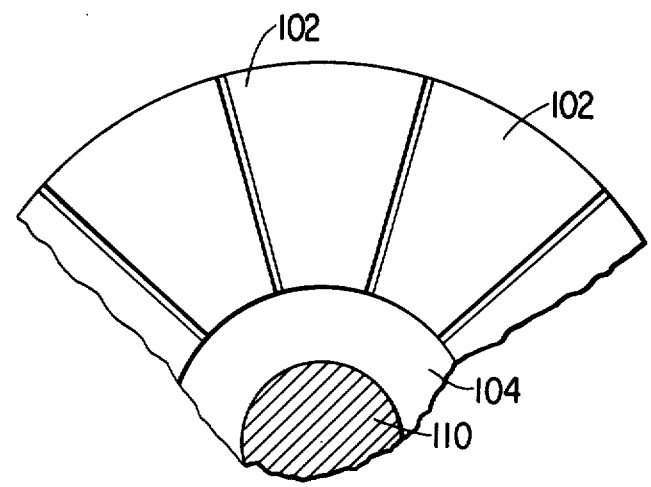
FIG. 5 is a fragmentary end view of the commutator of the motor of FIGS. 3 and 4.

Referring to the drawings and especially to FIG. 1, reference character 10 designates a brush board assembly according to the invention including a mounting board 12 of a resilient non-conductive material which is preferably plastic. The mounting board is in the form of a ring and has two crescent-like arms 14 and 16 which are separated from an outer annular portion 18 by arcuate gaps 20 and 22 respectively. Each of the arms has a free end which supports a carbon brush. As shown, a brush 24 is provided at the free end of arm 14, and a brush 26 is provided on the free end of arm 16. Brush 24 is secured to arm 14 by passing a cylindrical end portion 30 of the brush through an opening 32 in the arm at the end of an arcuate segment 36 of printed circuitry of the board, and then cementing the brush with a conductive epoxy cement 40 to the board and the said printed circuit (see FIG. 2). Brush 26 is similarly secured to arm 16 and an arcuate segment 42 of printed circuitry thereon.

The printed circuitry includes, in addition to arcuate segments 36 and 42, other arcuate segments 44, 46, 48 and 50 located on the outer annular portion 18 of mounting board 12 where adjacent end terminals 52-54, 56-58, 60-62 and 64-66 of these segments are interconnected by diode rectifiers 68, 70, 72 and 74, respectively. A branch 76 of the printed circuitry connects the printed segment 36 on arm 14 with printed segment 44 at 66, and another branch 78 connects printed segment 42 on arm 16 with printed segment 48 at terminal 58. Leads 80 and 82 connect with the printed circuitry at intermediate terminals 84 and 86, respectively in segments 46 and 50.

In FIGS. 3 and 4, the brush board assembly 10 may be seen in the environment of a motor 88 with the brushes 24 and 26 pressed against a flat end rotatable commutator 90, and the brush holding arms 14 and 16 resiliently deflected by the commutator slightly out of the plane of the outer annular portion 18 of the brush board which is held between inside flanges 94 and 96 on motor casing portions 98 and 100, respectively. The commutator consists of conductive segments 102 suitably mounted or printed upon a rotatable member 104, and connected to the wires 106 of the armature 108 of motor 88.

The armature shaft 110 is mounted for rotation in bearings 112 and 114 as shown, and has member 104 suitably affixed thereon. The armature rotates between the opposing poles of magnets as indicated, for example, at 116 and 118. The motor wherein the brush board assembly is utilized is preferably, but not necessarily, a single air gap motor of the type disclosed for example in U.S. Pat. No. 3,891,876 for "Permanent Magnet-Electric Motor Having a Non-Ferrous Solid Armature" and U.S. Pat. No. 4,063,123 for "Rotor Winding Improvement" issued June 24, 1975 and Dec. 13, 1977, respectively to John A. Herr and Wolfgang Jaffe; such motors being especially suitable for driving sewing machines, portable tools and other devices where small size, light weight, low cost, high torque-to-inertial ratio, long brush life and freedom from inherent electromagnetic interference are important factors.

Figure 6:
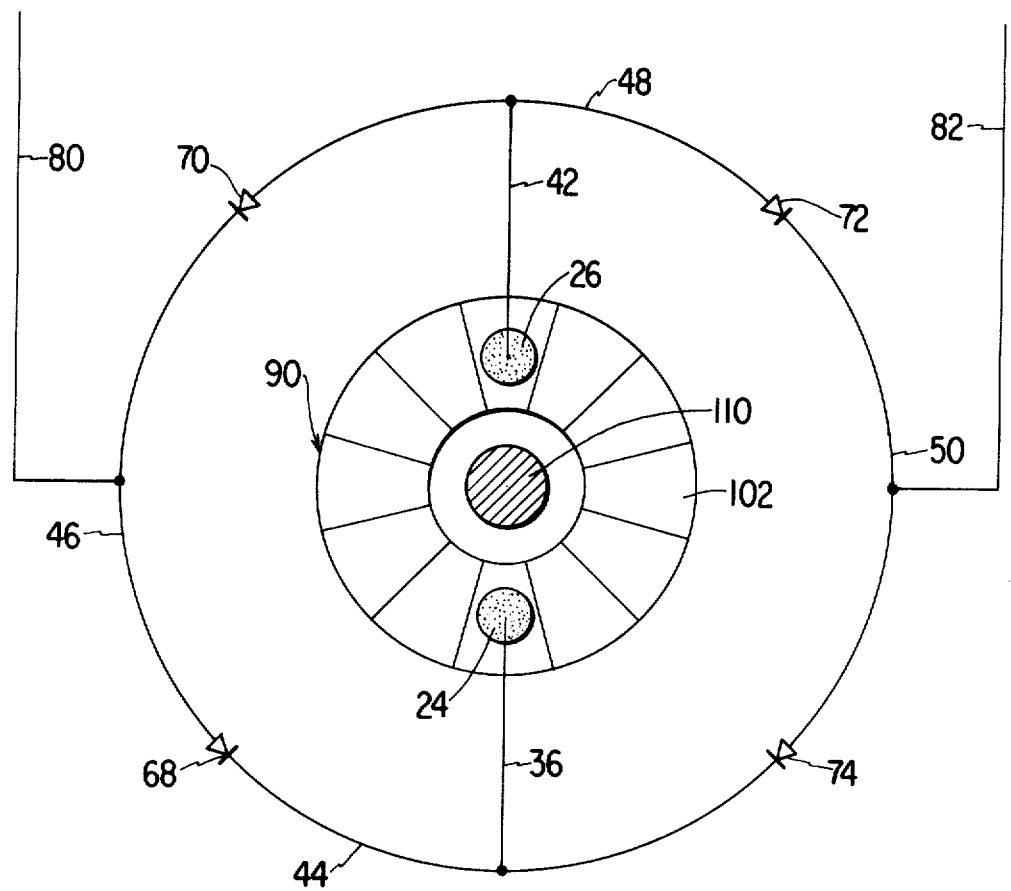
FIG. 6 is a diagrammatic representation showing the circuitry on the brush board assembly.

The motor 88 is controllable by AC voltage signals across the leads 80 and 82 which connect with the circuitry on mounting board 12. As best seen in FIG. 6, such circuitry extending to the brushes 24 and 26 includes the rectifiers 60, 70, 72 and 74, and the printed segments 36, 42, 44, 46, 48 and 50, all arranged to define a full wave bridge rectifying circuit.

Other forms of the invention than that described herein are also possible, and it is to be understood that the embodiment disclosed herein is in no way to be constured as a limitation of the invention. Numerous alterations and modification of the disclosed structures will suggest themselves to those skilled in the art, and all such alterations and modifications which do not depart from the spirit and scope of the invention are intended to be within the scope of the appended claims.

I claim:

1. A brush board assembly for a dynamoelectric machine comprising a mounting board of a resilient non-conductive material in the form of a ring including as an integral part of the board, a pair of cresent shaped flexible arms which are separate from an outer annular portion of the board by arcuate gaps and which have diametrically opposite free end portions that are movable out of the plane of the outer annular portion of the board; a commutator engageable brush on each end portion of the arms; and printed circuitry on the outer annulr portion of the board extending therefrom along each of the arms to connect with the brush thereon.

2. A brush board assembly according to claim 1 wherein the brushes are cemented to the printed portions of the circuitry on said arms with a conductive epoxy cement.

* * * * *